United States Patent [19]

Hoeft

[11] 4,234,962
[45] Nov. 18, 1980

[54] AUTOMATIC AFT DEFEAT CIRCUIT
[75] Inventor: Jon L. Hoeft, Rochester, N.Y.
[73] Assignee: GTE Products Corporation, Stamford, Conn.
[21] Appl. No.: 76,016
[22] Filed: Sep. 17, 1979
[51] Int. Cl.³ .............................................. H04B 1/16
[52] U.S. Cl. .................................. 455/173; 455/182; 455/192
[58] Field of Search ............... 455/173, 182, 192, 257, 455/258; 358/195.1; 334/14–16

[56] References Cited
U.S. PATENT DOCUMENTS

| | | | |
|---|---|---|---|
| 3,440,544 | 4/1969 | Pampel | 455/173 |
| 3,705,356 | 12/1972 | Russell | 455/182 |
| 3,750,028 | 7/1973 | Uchida | 455/182 |
| 3,939,427 | 2/1976 | Mueller | 455/173 |

*Primary Examiner*—Jin F. Ng
*Attorney, Agent, or Firm*—John A. Odozynski

[57] ABSTRACT

A manual AFT switch and a manual FINE TUNE switch are configured so that whenever the FINE TUNE switch is engaged the AFT detector output is automatically disconnected from the AFT input of a tuning voltage control circuit. Furthermore a loading circuit coupled to the AFT input and driven by either the AFT switch or FINE TUNE switch assures the desired impedance at the AFT input whenever the output of the AFT detector is so disconnected.

Automatically defeating the AFT circuit during manual fine tuning tends to optimize fine tuning by eliminating a component of correction voltage contributed by the AFT system, a face of which the lay viewer is likely to be unaware.

12 Claims, 1 Drawing Figure

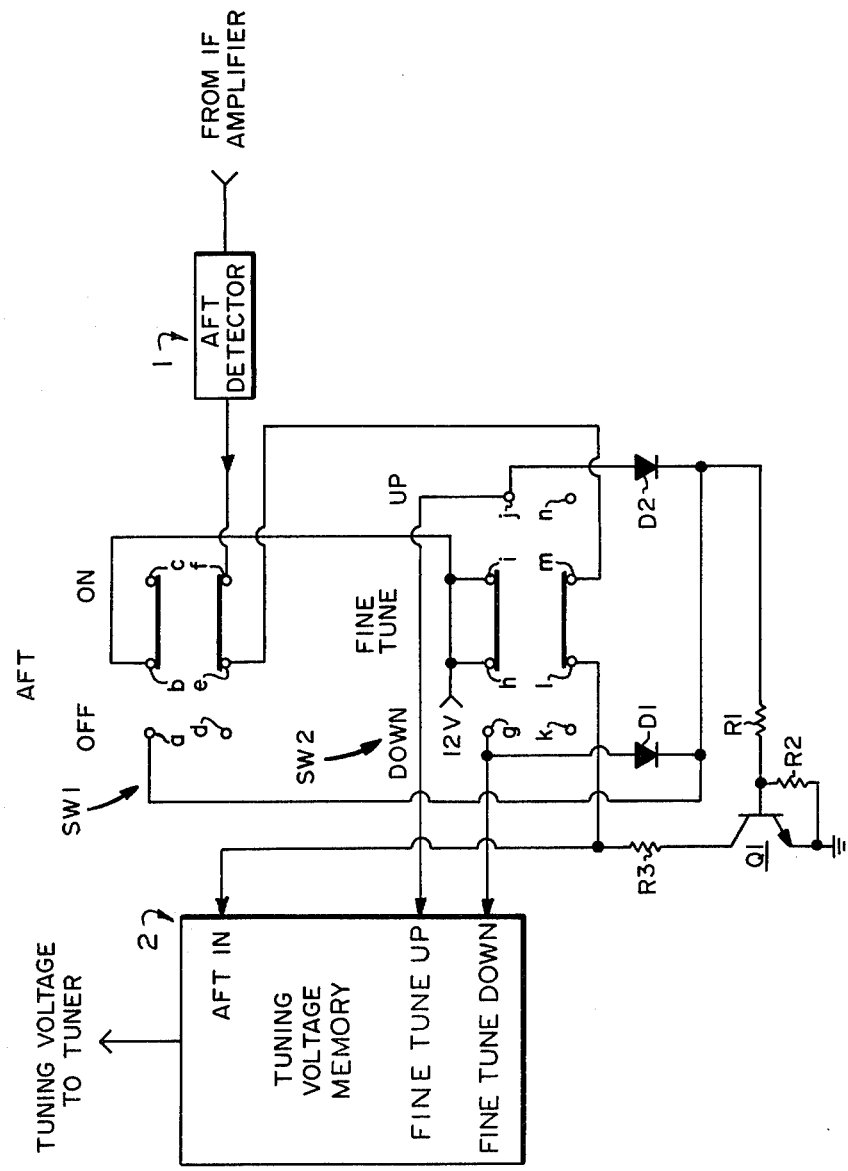

AUTOMATIC AFT DEFEAT CIRCUIT

TECHNICAL FIELD

This invention relates to tuning systems for television receivers and more particularly to circuitry for defeating the action of the AFT (Automatic Fine Tuning) system during manual fine tuning.

BACKGROUND ART

In conventional television receivers fine tuning of the local oscillator is effected through both a manual, viewer-accessible, fine-tuning control and the application of an automatic control voltage developed by the receiver's AFT circuit. These two controls are unavoidably interactive and optimum manual fine tuning can only be accomplished upon disabling the AFT circuit. Unless this is done, it is possible for the local oscillator to be fine tuned within the AFT circuit's hold-in range but outside its pull-in range. The result in a receiver fine tuned in this manner would be the loss of proper fine tuning when the viewer changes channels and subsequently returns to the original channel. This effect can be avoided by disabling the AFT circuit prior to engaging the manual fine tuning control. However, this requires a viewer-accessible "AFT-defeat" mechanism and, even when available, a large number of viewers are unaware of its necessity. Accordingly, this invention is directed to a circuit that automatically disables the AFC circuit whenever the manual fine tuning control is engaged.

DISCLOSURE OF THE INVENTION

The invention is an automatic AFT defeat circuit for use in conjunction with a tuning voltage control circuit that effects manual fine tuning via the application of a FINE TUNING voltage through a FINE TUNE switch. The output of the AFT detector is coupled to the control circuit through the switch. The switch is so arranged that whenever it is activated the AFT detector output will be disconnected from the control circuit, thereby assuring proper fine tuning.

BRIEF DESCRIPTION OF THE DRAWING

The sole drawing is a schematic diagram of the subject automatic AFT defeat circuit.

DISCLOSURE OF THE PREFERRED EMBODIMENT

For a better understanding of the present invention, together with other and further objects, advantages and capabilities thereof, reference is made to the following disclosure and appended claims in connection with the above-described drawing.

Referring now to the drawing, a portion of the nominal 45.75 MHz IF signal is coupled to the input of an AFT detector, 1. The output of the AFT detector, a DC voltage that varies in accordance with the variation of actual frequency of the IF signal from the nominal value, is coupled via a DPDT AFT switch, SW1, and a nomentary DPDT FINE TUNE switch, SW2, to the AFT input of a tuning voltage memory circuit 2. As will be clear from the description below, the output of the AFT detector will appear at the AFT input of the memory circuit only when the SW1 is in the ON position and SW2 is deactivated.

A detailed description of the memory circuit is not necessary for a thorough understanding of this invention and it should suffice to note that memory circuit provides a tuning voltage at its output corresponding to the channel selected. This voltage is applied to a voltage-dependent reactive element, for example, a varactor diode, in the tuner so that the tuner's local oscillator operates at the frequency required for the channel selected. Errors in the oscillator frequency can be corrected through the viewer-operated FINE TUNE switch (with the AFT switch off). For example, depression of the SW2 in one direction will cause the application of 12 volts to the FINE TUNE UP terminal of the memory circuit and the tuning voltage will increase; on the other hand, depression in the opposite direction will cause the application of 12 volts to the FINE TUNE DOWN terminal and the tuning voltage will decrease. When SW2 is released, it will return to its center position and the fine tuning voltage will remain at the value established. Subsequent frequency errors can be corrected automatically through the application of the AFT voltage to the AFT input of the memory circuit. As can be seen the fine tuning voltage represents a combination of the voltage generated in response to the channel selection process, as modified when the FINE TUNE switch is activated, and the AFT voltage.

As can be seem from the drawing, SW1 has a first section comprising terminals (a), (b) and (c) and a second section comprising terminals (d), (e) and (f), (b) and (e) being the respective poles of the first and second sections. Similarly SW2 has a first section comprising terminals (g), (h), (i), and (j) and a second section comprising terminals (k), (l), (m) and (n). Terminals (h) and (i) constitute the pole of the first section. Terminals (l) and (m) constitute the pole of the second section. The output of the AFT detector is connected to terminal (f) and, with SW1 in the ON position, through terminal (e) to terminal (m) of SW2. Terminal (j) of SW2 is connected to the FINE TUNE UP input of the memory circuit; terminal (g) to the FINE TUNE DOWN input. Terminals (h) and (i) are connected to a 12-volt source of fine tuning voltage and to terminal (b) of SW1. Terminal (l) of SW2 is connected to the AFT input of the memory circuit. Terminals (g) and (j) are also connected to the anodes of diodes D1 and D2, respectively. The cathodes of D1 and D2 are connected to terminal (a) of SW1 and coupled through a resistor, R1, to the base of a transistor Q1. Q1 has an emitter connected to ground and a collector coupled through a resistor, R3, to the AFT input. The base of Q1 is coupled to ground via a resistor R2. Q1, D1, D2, and R1-R3 form a loading circuit that assures the desired load resistance at the AFT input during situations with it is disconnected from the AFT detector output.

Whenever the SW2 is depressed in either the FINE TUNE UP or FINE TUNE DOWN direction, terminals (l) and (m) will become disconnected, thereby separating the output of the AFT detector from the AFT input. This effectively defeats the AFT action and allows proper fine tuning. In addition, whenever SW2 is depressed either terminals (g) and (h) will be connected or terminals (i) and (j) will be connected and 12 volts appear at the anode of either D1 or D2. The resulting current into the base of Q1 will cause it to become saturated and effectively short R3 to ground. The value of R3 is chosen to present the desired resistance at the AFT input. The same effect will exist when the SW1 is placed in the OFF position. 12 volts will be coupled from terminal (b) to terminal (a) and into the base of Q1 which will again become effectively saturated. D1 and D2 serve to isolate terminal (a) from terminals (j) and (g) whenever SW1 is in the OFF position and SW2 is depressed.

It should be noted that both SW1 and SW2 would be required, in some form, in a television receiver not having an automatic AFT defeat feature as disclosed herein. By appropriately arranging these switches and by including a minimal amount of additional circuitry, this invention assures substantially improved interaction between the AFT circuitry and the manually-controlled, viewer-accessible FINE TUNE control. However, it is clear that this invention contemplates configurations of an AFT switch and FINE TUNE control other than the configuration specifically described herein.

Accordingly, while there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

This invention is useful in broadcast television receivers in order to assure proper operation of the receiver's AFT system.

What is claimed is:

1. An automatic AFT defeat circuit for a tuning voltage memory system having both AFT and FINE TUNING inputs, the defeat circuit comprising:
   a source of fine tuning voltage,
   a manual FINE TUNE switch having first and second sections, each with respective first, second and third terminals wherein the switch is so arranged and constructed that the first and second terminal of each section are connected when the FINE TUNE switch is activated and the second and third terminals are connected when the FINE TUNE switch is de-activated, and wherein:
   (1) the first terminal of the first section is connected to the FINE TUNING input,
   (2) the second and third terminals of the first section are connected to the source of FINE TUNING voltage,
   (3) the second terminal of the second section is connected to the AFT input, and
   (4) the third terminal of the second section is coupled to the output of an AFT detector.

2. An Automatic AFT Defeat circuit as defined in claim 1 further comprising loading means having an input coupled to the FINE TUNE switch and an output coupled to the AFT input for presenting the desired impedance at that input when the FINE TUNE switch is activated.

3. An Automatic AFT Defeat circuit as defined in claim 2 wherein the loading means comprises:
   a semiconductor switch;
   diode means coupled between the first terminal of the first section and the input of the semiconductor switch, and a resistance coupled between the output of the semiconductor switch is rendered conductive when the FINE TUNE switch is activated.

4. An Automatic AFT Defeat circuit as defined in claim 3 further comprising an AFT switch having two sections each with respective first, second and third terminals wherein the AFT switch is so arranged and constructed that the first and second terminals of each section are connected in the AFT OFF condition and the second and third terminals are connected in the AFT ON condition, and wherein:
   (1) the first terminal of the first section of the AFT switch is connected to the input of the semiconductor switch,
   (2) the second terminal of the first section of the AFT switch is connected to the source of fine tuning voltage,
   (3) the second terminal of the second section of the AFT switch is connected to the third terminal of the second section of the FINE TUNE switch, and
   (4) the third terminal of the second section of the AFT switch is coupled to the output of the AFT detector so that when the AFT switch is in the OFF condition the output of the AFT detector is disconnected from the FINE TUNE switch, and therefore from the tuning voltage control circuit, and the semiconductor switch is rendered conductive so that the desired impedance is presented at the AFT input.

5. An Automatic AFT Defeat circuit for a tuning voltage control system having AFT, Fine Tune Up and Fine Tune Down inputs, the defeat circuit comprising:
   a source of fine tuning voltage;
   a manual FINE TUNE switch having a first section comprising first, second, third and fourth terminals and having a second section comprising first and second terminals wherein the switch is so arranged and constructed that the first and second terminals of the first section are connected when the FINE TUNE switch is in the DOWN position, the third and fourth terminals of the first section are connected when the FINE TUNE switch is in the UP position and the first and second terminals of the second section are connected when the FINE TUNE switch is deactivated, and wherein:
   (1) the first terminal of the first section is connected to the Fine Tune Down input,
   (2) the second and third terminals of the first section are connected to the source of fine tuning voltage,
   (3) the fourth terminal of the first section is connected to the Fine Tune Up input,
   (4) the first terminal of the second section is connected to the AFT input, and
   (5) the second terminal of the second section is coupled to the output of an AFT detector.

6. An Automatic AFT defeat circuit as defined in claim 5 further comprising loading means having an input coupled to the FINE TUNE switch and an output coupled to the AFT input for presenting the desired impedance of that input whenever the FINE TUNE switch is activated.

7. An Automatic AFT defea circuit as defined in claim 6 wherein the loading means comprises:
   a semiconductor switch,
   first diode means coupled between the semiconductor switch and the Fine Tune Down input,
   second diode means coupled between the semiconductor switch and the Fine Tune Up input, and
   a resistance coupled between the semiconductor switch and the AFT input, whereby the semiconductor switch is rendered conductive whenever the FINE TUNE switch is activated.

8. In a tuning voltage memory system having both AFT and Fine Tuning inputs, the improvement comprising means for automatically defeating AFT operation during fine tuning conditions, said means including:
a source of fine tuning voltage;
a manual FINE TUNE switch having a first and second sections comprising respective first and second terminals, wherein the switch is so arranged and constructed that the first and second terminals of the first section are connected when the FINE TUNE switch is engaged and disconnected when the FINE TUNE switch is disengaed and the first and second terminals of the second section are disconnected when the FINE TUNE switch is engaged and connected when the FINE TUNE switch is disengaged and wherein;
(1) the first terminal of the first section is connected to the Fine Tuning input,
(2) the second terminal of the first section is connected to the source of fine tuning voltage,
(3) the first terminal of the second section is connected to the AFT input, and
(4) the second terminal of the second section is coupled to the output of an AFT detector.

9. An improvement as defined in claim 8 further comprising loading means having an input coupled to the FINE TUNE switch and an output coupled to the AFT input for presenting the desired impedance at the AFT input whenever the FINE TUNE switch is engaged.

10. The improvement as defined in either claim 8 or claim 9 further comprising: an AFT switch having first and second terminals, wherein the AFT switch is so arranged and constructed that the first and second terminals are connected in the AFT ON condition and disconnected in the AFT OFF condition and wherein:
(1) the first terminal of the AFT switch is connected to the second terminal of the second section of the FINE TUNE switch and
(2) the second terminal of the AFT switch is connected to the output of the AFT detector.

11. An improvement as defined in claim 9 further comprising an AFT switch having first and second sectons with respective first and second terminals, wherein the switch is so arranged and constructed that the first and second terminals of the first section are connected when the AFT switch is in the OFF condition and the first and second terminals of the second section are connected when the AFT switch is in the ON condition and wherein:
(1) the first terminal of the first section of the AFT switch is connected to the loading means,
(2) the second terminal of the second section of the AFT switch is connected to the source of fine tuning voltage,
(3) the first terminal of the second section of the AFT switch is connected to the second terminal of the second section of the FINE TUNE switch and
(4) the second terminal of the second section of the AFT switch is connected to the output of the AFT detector.

12. An improvement as defined in either claim 9 or claim 11 wherein the loading means comprises: a semiconductor switch, diode means connected between the FINE TUNE switch and
the semiconductor switch, and a resistance connected between the semiconductor switch and the AFT input.

* * * * *

UNITED STATES PATENT AND TRADEMARK OFFICE
CERTIFICATE OF CORRECTION

PATENT NO. : 4,234,962
DATED : November 18, 1980
INVENTOR(S) : Jon Leon Hoeft

It is certified that error appears in the above-identified patent and that said Letters Patent are hereby corrected as shown below:

In the "ABSTRACT", line 13, "face" should read -- fact --

Column 4, line 56, Claim 7, "Defea" should read -- Defeat --

Column 6, line 8, Claim 11, "sectons" should read -- sections --

Signed and Sealed this

Seventh Day of April 1981

[SEAL]

Attest:

RENE D. TEGTMEYER

Attesting Officer     Acting Commissioner of Patents and Trademarks